(12) United States Patent
Dinter et al.

(10) Patent No.: US 10,184,859 B2
(45) Date of Patent: Jan. 22, 2019

(54) ARRANGEMENT WITH WIRELESSLY INTERROGATABLE SAW SYSTEM ATTACHED TO ROTATING SHAFT OF BEARING ASSEMBLY

(71) Applicant: SIEMENS AKTIENGESELLSCHAFT, München (DE)

(72) Inventors: Ralf Martin Dinter, Gelsenkirchen (DE); Udo Jansen, Bocholt (DE); Thomas Meyer, Stolberg (DE); Jan-Dirk Reimers, Aachen (DE)

(73) Assignee: Flender GmbH, Bocholt (DE)

( * ) Notice: Subject to any disclaimer, the term of this patent is extended or adjusted under 35 U.S.C. 154(b) by 227 days.

(21) Appl. No.: 15/053,658

(22) Filed: Feb. 25, 2016

(65) Prior Publication Data

US 2016/0252426 A1 Sep. 1, 2016

(30) Foreign Application Priority Data

Feb. 26, 2015 (EP) .................................. 15156700

(51) Int. Cl.
*G01M 13/04* (2006.01)
*F16C 41/00* (2006.01)
(Continued)

(52) U.S. Cl.
CPC .......... *G01M 13/045* (2013.01); *F16C 19/52* (2013.01); *F16C 41/008* (2013.01); *F16J 15/3296* (2013.01)

(58) Field of Classification Search
CPC .... F16C 2233/00; F16C 41/008; F16C 19/52; F16C 19/527; F16C 19/522;
(Continued)

(56) References Cited

U.S. PATENT DOCUMENTS 3,929,009 A * 12/1975 Lutz .................... E21B 47/0006
73/862.338
5,585,571 A * 12/1996 Lonsdale ................ G01L 1/165
73/862.321
(Continued)

FOREIGN PATENT DOCUMENTS

CN 1412564 A 4/2003
DE 10024035 B4 6/2010
(Continued)

*Primary Examiner* — Daniel S Larkin
*Assistant Examiner* — David L Singer
(74) *Attorney, Agent, or Firm* — Henry M. Feiereisen LLC

(57) ABSTRACT

An arrangement includes a shaft arranged within a housing and sized to project through a housing opening, and a shaft sealing ring arranged between the housing and the shaft in a region of the housing opening. A wirelessly interrogatable SAW system has an interrogation unit, at least one stationary first antenna electrically connected to the interrogation unit, at least one rotating second antenna attached in fixed rotative engagement to the shaft, and at least one wirelessly interrogatable SAW sensor attached in fixed rotative engagement to the shaft and electrically connected to the at least one second antenna. The first and second antennas are arranged to overlap each other in a radial direction. Closing the housing is an annular housing cover to which the first antenna is attached at a distance from the second antenna in an axial direction.

9 Claims, 3 Drawing Sheets

(51) Int. Cl.
*F16J 15/3296* (2016.01)
*F16C 19/52* (2006.01)

(58) Field of Classification Search
CPC .... F16C 2360/31; G01L 1/165; G01L 5/0009; G01M 13/045; F16J 15/3296; F03D 17/00; F03D 15/00
USPC ................ 73/593, 112.01, 862.08, 862.325; 310/68 B
See application file for complete search history.

(56) References Cited

U.S. PATENT DOCUMENTS

| | | | | |
|---|---|---|---|---|
| 6,014,083 | A * | 1/2000 | Bauerschmidt | H01H 9/168 324/126 |
| 8,128,525 | B2 | 3/2012 | Dinter et al. | |
| 8,591,371 | B2 | 11/2013 | Dinter et al. | |
| 8,632,437 | B2 | 1/2014 | Dinter et al. | |
| 2002/0050754 | A1 | 5/2002 | Hakamata et al. | |
| 2002/0062694 | A1* | 5/2002 | Ehrfeld | F16C 19/522 73/593 |
| 2004/0244496 | A1* | 12/2004 | Bernhard | G01L 3/10 73/779 |
| 2006/0124353 | A1* | 6/2006 | Juhasz | E21B 19/07 175/40 |
| 2006/0236782 | A1* | 10/2006 | Hasken | G01L 3/10 73/862.08 |
| 2007/0063870 | A1 | 3/2007 | Sahashi et al. | |
| 2007/0115131 | A1 | 5/2007 | Seriu et al. | |
| 2007/0159352 | A1 | 7/2007 | Sahashi et al. | |
| 2010/0160104 | A1* | 6/2010 | Dinter | F16H 57/0427 475/159 |
| 2011/0066255 | A1* | 3/2011 | Friesen | A61F 5/0102 623/32 |
| 2012/0108380 | A1* | 5/2012 | Dinter | F16C 17/10 475/159 |
| 2012/0125150 | A1* | 5/2012 | Dinter | F16J 15/46 74/730.1 |
| 2012/0160037 | A1* | 6/2012 | Dinter | F16H 57/01 73/862.08 |
| 2012/0191308 | A1* | 7/2012 | Poskie | G01L 3/102 701/51 |
| 2013/0088016 | A1* | 4/2013 | Dinter | F03D 11/02 290/55 |
| 2013/0095972 | A1* | 4/2013 | Dinter | F03D 11/02 475/149 |
| 2013/0270814 | A1 | 10/2013 | Anton et al. | |
| 2014/0000386 | A1* | 1/2014 | Malhan | G01L 3/108 73/862.338 |
| 2015/0338295 | A1* | 11/2015 | Kalinin | G01L 1/165 73/862.325 |
| 2015/0369678 | A1* | 12/2015 | Yoshida | G01L 3/10 73/862.325 |
| 2016/0084734 | A1* | 3/2016 | May | G01N 3/02 73/774 |
| 2016/0299019 | A1* | 10/2016 | Curlier | G01L 25/003 |

FOREIGN PATENT DOCUMENTS

| | | |
|---|---|---|
| EP | 1293766 A1 | 3/2003 |
| EP | 1621863 A2 | 2/2006 |
| JP | 2006138873 A | 6/2006 |
| WO | WO 2011069519 A1 | 6/2011 |
| WO | WO 2013159840 A1 | 10/2013 |

* cited by examiner

ARRANGEMENT WITH WIRELESSLY INTERROGATABLE SAW SYSTEM ATTACHED TO ROTATING SHAFT OF BEARING ASSEMBLY

CROSS-REFERENCES TO RELATED APPLICATIONS

This application claims the priority of European Patent Application, Serial No. 15156700.5, filed Feb. 26, 2015, pursuant to 35 U.S.C. 119(a)-(d), the disclosure of which is incorporated herein by reference in its entirety as if fully set forth herein.

BACKGROUND OF THE INVENTION

The present invention relates to an arrangement with a wirelessly interrogatable SAW system.

The following discussion of related art is provided to assist the reader in understanding the advantages of the invention, and is not to be construed as an admission that this related art is prior art to this invention.

A SAW (SAW=Surface Acoustic Wave) system that can be interrogated wirelessly is used to monitor function-relevant components and includes wirelessly interrogatable SAW sensors that do not require a separate energy source. SAW sensors which are simple in structure and normally inexpensive and maintenance-free are able to withstand high thermal and electromagnetic loads. Thus wirelessly interrogatable SAW sensors are suitable for use in places which are difficult to access, particularly in rotating parts.

It would be desirable and advantageous to address prior art shortcomings.

SUMMARY OF THE INVENTION

According to one aspect of the present invention, an arrangement includes a housing having an opening, a bearing assembly, at least one shaft arranged in the housing and supported by the bearing assembly, said shaft configured to project through the opening of the housing, a shaft sealing ring arranged between the housing and the shaft in a region of the opening of the housing, at least one wirelessly interrogatable SAW system including an interrogation unit, at least one stationary first antenna electrically connected to the interrogation unit, at least one second antenna attached in fixed rotative engagement to the shaft to conjointly rotate therewith, and at least one wirelessly interrogatable SAW sensor attached in fixed rotative engagement to the shaft and electrically connected to the at least one second antenna, the first and second antennas being arranged to overlap each other in a radial direction, and an annular housing cover configured to close the opening of the housing, the first antenna being attached to the housing cover at a distance from the second antenna in an axial direction.

Arrangement of the stationary antenna on the housing cover in accordance with the present invention is advantageous because wirelessly interrogatable SAW system components arranged inside the housing become readily accessible. As a result, subsequent assembly of the wirelessly interrogatable SAW system and performance of maintenance tasks are possible without difficulty. The presence of the housing cover advantageously shields the first and second antennas from the outside so that external impacts are prevented from adversely affecting the wirelessly interrogatable SAW system. As the first and second antennas are arranged adjacent to each other in an axial direction and overlap each other in a radial direction, data transfer is efficient. Moreover, the first and second antennas can be aligned with each other very effectively.

According to another advantageous feature of the present invention, at least one of the first and second antennas can be configured in the form of a ring or ring segment. Such a configuration is advantageous as the antennas can simultaneously act as an oil thrower or as labyrinth seal.

According to another advantageous feature of the present invention, the housing cover can include an annular first housing cover element defined by an internal diameter and configured to act as a support for the bearing assembly, and an annular second housing cover element defined by an internal diameter which is smaller than the internal diameter of the first housing cover element, with the shaft sealing ring arranged on the second housing cover element. Only the first housing cover provides a support function, and consequently the second housing cover element can readily be disassembled without jeopardizing the stability of the bearing assembly and hence the overall arrangement. Assembly, disassembly and maintenance tasks can therefore be performed easily. In particular, the wirelessly interrogatable SAW system can be installed even when the rest of the arrangement is already assembled.

According to another advantageous feature of the present invention, the stationary first antenna can be arranged on an end face of the second housing cover element, with the end face being oriented toward an interior of the housing.

According to another advantageous feature of the present invention, the stationary first antenna can be arranged on an end face of the first housing cover element, with the end face being oriented toward the second housing cover element.

According to another advantageous feature of the present invention, the at least one wirelessly interrogatable SAW sensor has a topside and can be arranged within a recess formed on an outer circumference of the shaft such that the topside does not project outward from the recess. It is therefore possible, for example, to remove a bearing assembly, which is arranged on the shaft and is adjacent to the wirelessly interrogatable SAW sensor, over the wirelessly interrogatable SAW sensor and off the shaft, without requiring dismantling of the wirelessly interrogatable SAW sensor beforehand.

According to another advantageous feature of the present invention, the recess can be configured in the form of a groove. Advantageously, the groove can have the shape of a circumferential groove. This results in a very simple structure.

According to another advantageous feature of the present invention, a protective layer can be applied upon the at least one wirelessly interrogatable SAW sensor. An example of a protective layer includes a silicone composition. As a result of the presence of such a protective layer, the wirelessly interrogatable SAW sensor is protected against external influences that can adversely affect operation of the SAW sensor.

According to another advantageous feature of the present invention, a retaining ring can be attached to the shaft, with the second antenna being arranged on the retaining ring. This results in a simple structure.

According to another advantageous feature of the present invention, the retaining ring can be configured to at least partially cover a recess formed in the shaft and can be configured to accommodate the at least one wirelessly interrogatable SAW sensor. The wirelessly interrogatable SAW sensor is therefore protected by the retaining ring of the second antenna. In this case, it is possible, in principle, to eliminate the need for additional protection of the SAW sensor by a protective layer.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
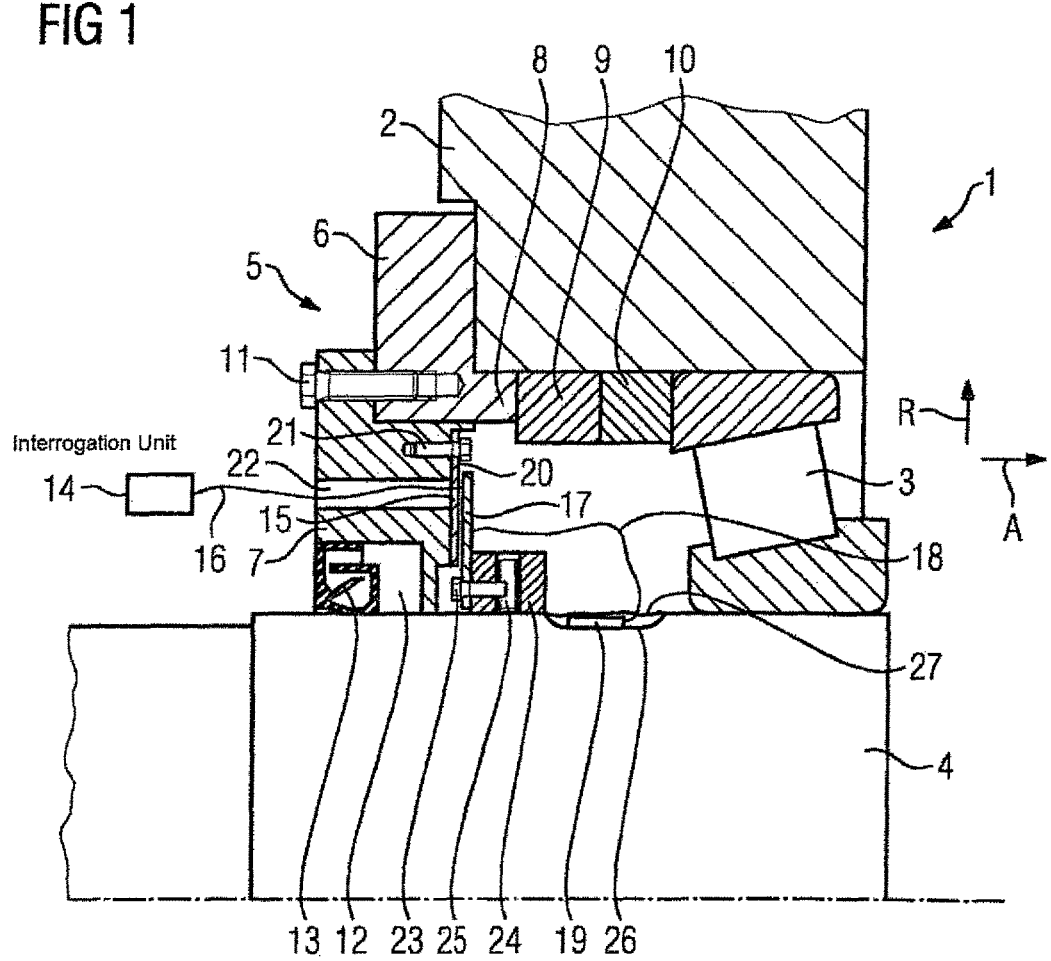
FIG. 1 is a schematic sectional partial view of a first embodiment of an arrangement according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic sectional partial view of a first embodiment of an arrangement according to the present invention, generally designated by reference numeral 1 and including a housing 2 in which a shaft 4 is arranged and supported by a bearing assembly, of which only bearing 3 is illustrated here. The housing 2 is provided with a housing opening, through which the shaft 4 projects. A two-part housing cover 5 is provided for closing the housing opening, and includes an annular first housing cover element 6 defined by an internal diameter and an annular second housing cover element 7 defined by an internal diameter which is smaller than the internal diameter of the first housing cover 6. The first housing cover element 6 is screwed to the housing 2 by screws (not shown) and has an annular shoulder 8 in the region of its inner circumference. The annular shoulder 8 is oriented in the direction of the bearing 3 and presses axially against the outer bearing ring of the bearing 3 via spacer rings 9 and 10, such that the bearing 3 is supported by the first housing cover element 6 of the housing cover 5. The second housing cover element 7 is attached to the first housing cover element 6 by screws 11 and accommodates a shaft sealing ring 13 in an annular cutout 12 that is formed on an inner circumference of the second housing cover element 7. The shaft sealing ring 13 seals the intermediate space between the second housing cover element 7 and the shaft 4.

For the purpose of monitoring the bearing 3, the arrangement 1 is equipped with a wirelessly interrogatable SAW system. The wirelessly interrogatable SAW system includes an interrogation unit 14, a stationary antenna 15 which is electrically connected to the interrogation unit 14 via a corresponding line 16, an antenna 17 in fixed rotative engagement with the shaft 4 so as to conjointly rotate with the shaft 4, and a wirelessly interrogatable SAW sensor 19 which is attached to the shaft 4 in a positionally fixed manner and electrically connected to the antenna 17 via a line 18 and which is positioned adjacent to the bearing 3.

The stationary antenna 15 is designed in the form of a ring and attached to an end face 20 of the second housing cover element 7 by screws 21, with the end face 20 being oriented toward the interior of the housing 2. A bore 22 extends outward from the end face 20 and through the second housing cover element 7 and accommodates the line 16.

The antenna 17 is likewise designed in the form of a ring and is attached by screws 23 to a retaining ring 24, which in turn is fixed to the shaft 4 by grub screws 25. The antenna 17 is positioned at a defined distance a from the stationary antenna 15 in an axial direction A, with the antenna 15 and the antenna 17 being arranged so as to overlap each other in a radial direction R.

The wirelessly interrogatable SAW sensor 19 is attached to the shaft 4 within a recess 26, which is formed in the shaft 4 and configured in the form of a circumferential groove. The depth of the circumferential groove is hereby selected such that the topside of the wirelessly interrogatable SAW sensor 19 does not project outward from the recess 26. In order to protect the wirelessly interrogatable SAW sensor against external influences, it is provided with a protective layer 27, e.g. a silicone layer.

During operation of the arrangement 1, the wirelessly interrogatable SAW system ascertains at least one physical variable (advantageously, a plurality of physical variables) which allows inference about the state and the remaining service life of the bearing 3. Examples of a physical variable may include temperature and/or torque and/or a force and/or a distribution of power and/or a strain, etc.

Figure 3:
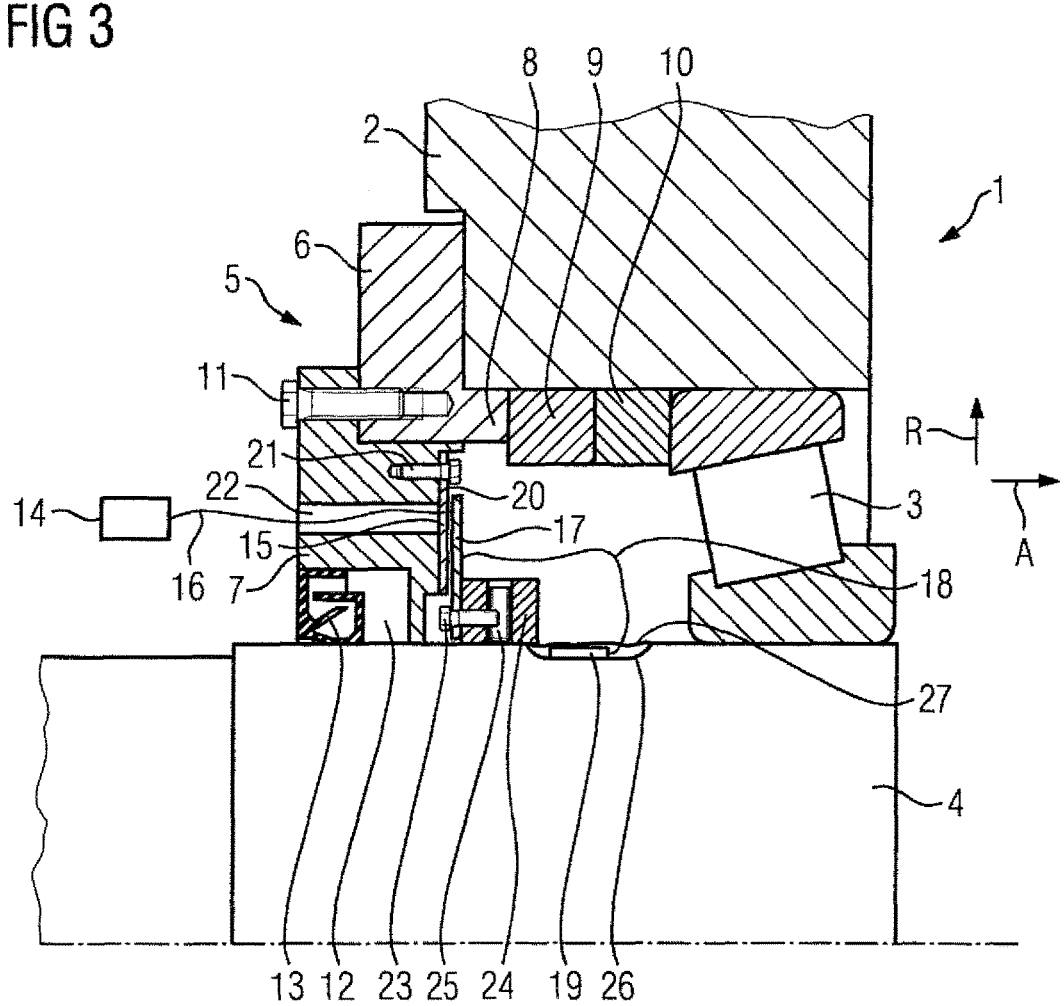
FIG. 3 is a schematic sectional partial view of a variation of the arrangement of FIG. 1.

An essential advantage of the arrangement 1, illustrated in FIG. 1, is that the wirelessly interrogatable SAW system can be installed, even when the remainder of the arrangement has already been assembled. For this purpose, the second housing cover element 7 is simply removed, whereupon the required installation space is accessible from the outside. It is equally easy to maintain or disassemble the wirelessly interrogatable SAW system. The first housing cover element 6 ensures the stability of the arrangement 1 during assembly, disassembly or maintenance, since the shoulder 8 thereof presses against the outer bearing ring of the bearing 3 via the spacer rings 9, 10, even when the second housing cover element 8 is removed. It is also of advantage that the antennas 15, 17 are electromagnetically shielded by the housing cover 5, thereby ensuring that the wirelessly interrogatable SAW system functions correctly. Moreover, by virtue of their design and arrangement, the antennas 15, 17 act as an oil thrower and/or labyrinth seal, and ensure that information and/or energy are transferred correctly. It should be noted that the retaining ring 24, via which the antenna 17 is mounted on the shaft 4, can in principle also be designed and assembled so as to cover the recess 26 and the wirelessly interrogatable SAW sensor 19 arranged therein, thereby protecting it from external influences. In this case, it is possible in principle to eliminate the need for a protective layer 27. By way of example, FIG. 3 shows a variation in which the retaining ring 24 at least partially covers the recess 26 in which the wirelessly interrogatable SAW sensor 19 is arranged.

Figure 2:
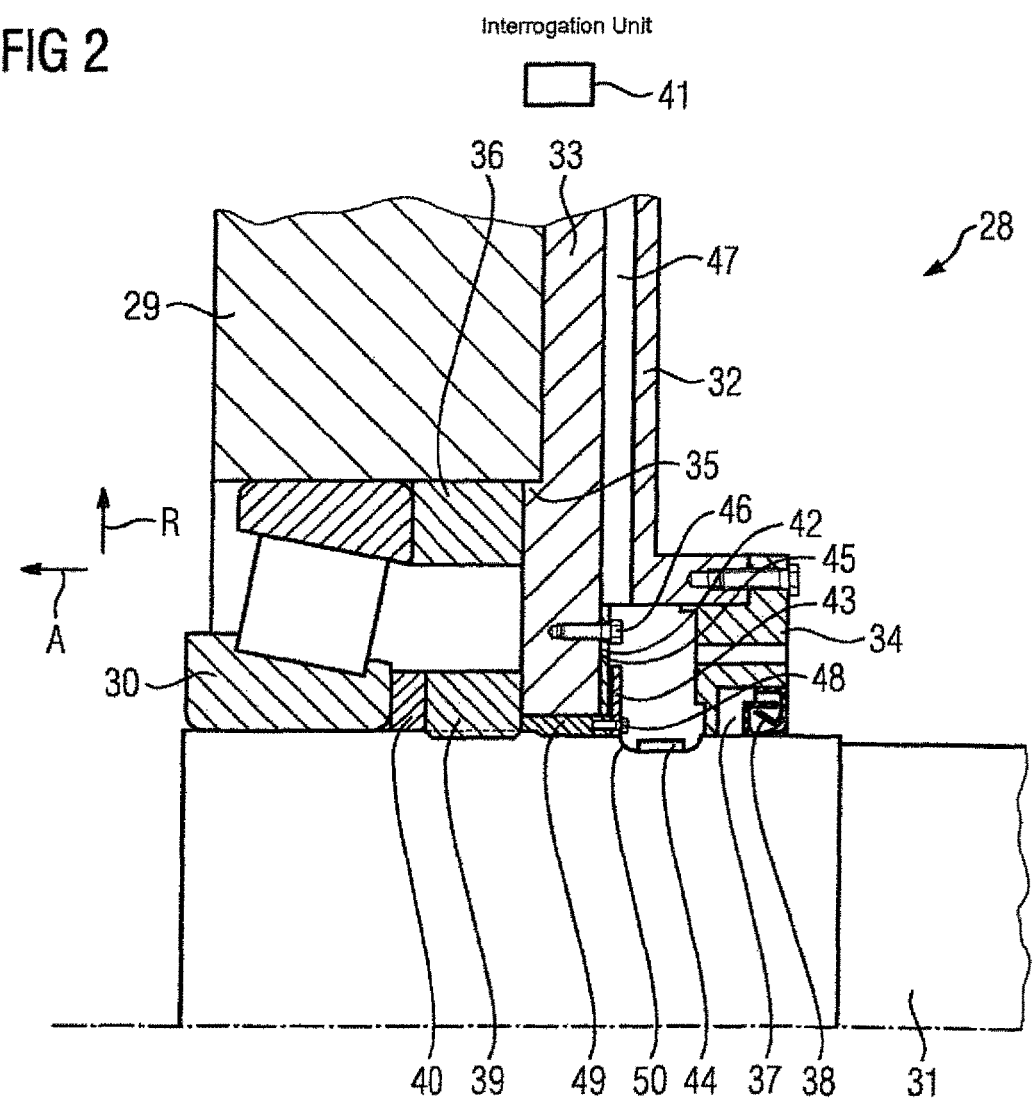
FIG. 2 is a schematic sectional partial view of a second embodiment of an arrangement according to the present invention.

FIG. 2 shows a schematic sectional partial view of a second embodiment of an arrangement according to the present invention, generally designated by reference numeral 28 and including a housing 29 in which a shaft 31 is arranged and supported by a bearing assembly, of which only bearing 30 is illustrated here. The housing 29 is provided with a housing opening, through which the shaft 31 projects. A two-part housing cover 32 is provided for the purpose of closing the housing opening, and includes an annular first housing cover element 33 defined by an internal diameter and an annular second housing cover element 34 defined by an internal diameter which is smaller than the internal diameter of the first housing cover element 33. The first housing cover element 33 is screwed to the housing 29 by screws (not shown) and has an annular shoulder 35 in the region of its inner circumference. The annular shoulder 35 is oriented in the direction of the bearing 30 and presses axially against the outer bearing ring of the bearing 30 via a spacer ring 36, such that the bearing 30 is supported by the first housing cover element 33 of the housing cover 32. The second housing cover element 34 is attached to the first housing cover element 33 by screws (likewise not shown) and accommodates a shaft sealing ring 38 in an annular cutout 37 that is formed on its inner circumference. The shaft sealing ring 38 seals the intermediate space between the second housing cover element 34 and the shaft 31. A threaded ring 39 is screwed onto the shaft 31 in the region between the first housing cover element 33 and the hearing 30 as a stop for the inner bearing ring of the bearing 30, and presses against the lower bearing ring via a spacer ring 40 which is pushed onto the shaft 31.

For the purpose of monitoring the bearing 30, the arrangement 28 is equipped with a wirelessly interrogatable SAW system. The wirelessly interrogatable SAW system includes an interrogation unit 41, a stationary antenna 42 which is electrically connected to the interrogation unit 40 via a line (not shown), an antenna 43 which is attached in fixed rotative engagement to the shaft 31 so as to conjointly rotate with the shaft 31, and a wirelessly interrogatable SAW sensor which is attached to the shaft 31 in a positionally fixed manner and is electrically connected to the antenna 43 via a line (likewise not shown).

The stationary antenna 42 is designed in the form of a ring and is attached here to an end face 45 of the first housing cover element 33 by screws 46, with the end face 45 being oriented toward the second housing cover element 34. Extending radially through the first housing cover element 33 and opening into the region of the end face 45 is a bore 47 which accommodates the line that connects the stationary antenna 42 to the interrogation unit 41.

The antenna 43 is likewise designed in the form of a ring and attached by screws 48 to a retaining ring 49, which in turn is fixed to the shaft 31 by grub screws (not shown). The antenna 43 is positioned at a defined distance a from the stationary antenna 42 in an axial direction A, with the antenna 42 and the antenna 43 being arranged so as to overlap each other in a radial direction R.

The wirelessly interrogatable SAW sensor 44 is attached to the shaft 31 within a recess 50, which is formed in the shaft 31 and configured in the form of a circumferential groove. The depth of the circumferential groove is selected such that the topside of the wirelessly interrogatable SAW sensor 44 does not project outward from the recess 50.

The arrangement 28 illustrated in FIG. 2 is likewise characterized by reliable functionality and a simple assembly, maintenance and disassembly of the wirelessly interrogatable SAW system. Assembly, maintenance or disassembly can be performed, even when all of the other components of the arrangement 28 have already been assembled.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. An arrangement, comprising:
a housing having an opening;
a bearing assembly;
at least one shaft arranged in the housing and supported by the bearing assembly, said shaft configured to project through the opening of the housing;
a shaft sealing ring arranged between the housing and the shaft in a region of the opening of the housing;
at least one wirelessly interrogatable SAW system including an interrogation unit, at least one stationary first antenna electrically connected to the interrogation unit, at least one second antenna attached in fixed rotative engagement to the shaft to conjointly rotate therewith, and at least one wirelessly interrogatable SAW sensor attached in fixed rotative engagement to the shaft and electrically connected to the at least one second antenna, said first and second antennas being arranged to overlap each other in a radial direction;
an annular housing cover configured to close the opening of the housing, said first antenna being attached to the housing cover at a distance from the second antenna in an axial direction; and
a retaining ring attached to the shaft and configured to at least partially cover a recess formed in the shaft and configured to accommodate the at least one wirelessly interrogatable SAW sensor, said second antenna being arranged on the retaining ring.

2. The arrangement of claim 1, wherein at least one of the first and second antennas is configured in the form of a ring or ring segment.

3. The arrangement of claim 1, wherein the housing cover comprises an annular first housing cover element defined by an internal diameter and configured to act as a support for the bearing assembly, and an annular second housing cover element defined by an internal diameter which is smaller than the internal diameter of the first housing cover element, said shaft sealing ring being arranged on the second housing cover element.

4. The arrangement of claim 3, wherein the first antenna is arranged on an end face of the second housing cover element, said end face being oriented toward an interior of the housing.

5. The arrangement of claim 3, wherein the first antenna is arranged on an end face of the first housing cover element, said end face being oriented toward the second housing cover element.

6. The arrangement of claim 1, wherein the at least one wirelessly interrogatable SAW sensor has a topside and is arranged within the recess formed on an outer circumference of the shaft such that the topside does not project outward from the recess.

7. The arrangement of claim 6, wherein the recess is configured in the form of a groove.

8. The arrangement of claim 7, wherein the groove is a circumferential groove.

9. The arrangement of claim 1, further comprising a protective layer applied upon the at least one wirelessly interrogatable SAW sensor.

* * * * *